US012276282B2

(12) United States Patent
Hvasta et al.

(10) Patent No.: US 12,276,282 B2
(45) Date of Patent: Apr. 15, 2025

(54) CIRCULATION PUMP MADE FROM BRITTLE MATERIAL

(71) Applicant: Fourth Power, Inc., Cambridge, MA (US)

(72) Inventors: Mike Hvasta, Lawrence Township, NJ (US); Colin Kelsall, Cambridge, MA (US); Asegun Henry, Hyde Park, MA (US); Sandeep Pidaparti, Burlington, MA (US); Joe Patrinostro, Centerville, MA (US)

(73) Assignee: Fourth Power, Inc., Cambridge, MA (US)

( * ) Notice: Subject to any disclaimer, the term of this patent is extended or adjusted under 35 U.S.C. 154(b) by 0 days.

(21) Appl. No.: 18/419,097

(22) Filed: Jan. 22, 2024

(65) Prior Publication Data

US 2024/0247657 A1  Jul. 25, 2024

Related U.S. Application Data

(60) Provisional application No. 63/480,891, filed on Jan. 20, 2023.

(51) Int. Cl.
*F04D 13/06* (2006.01)
*H02S 10/30* (2014.01)

(52) U.S. Cl.
CPC .............. *F04D 13/06* (2013.01); *H02S 10/30* (2014.12)

(58) Field of Classification Search
CPC .......... F04D 7/06; F04D 7/065; F04D 13/021; F04D 13/06; F04D 13/062; F04D 13/0633; F04D 13/065; F04D 29/04; F04D 29/0405; F04D 29/043; F04D 29/044; F04D 29/0473
See application file for complete search history.

(56) References Cited

U.S. PATENT DOCUMENTS

| 4,065,232 A | 12/1977 | Stratienko | |
|---|---|---|---|
| 6,524,066 B2 * | 2/2003 | Thut | .................... F04D 29/2288 415/206 |
| 6,890,104 B2 * | 5/2005 | Gomyo | .................... F16C 17/02 |

(Continued)

FOREIGN PATENT DOCUMENTS

| CN | 104696266 A | 6/2015 |
|---|---|---|
| CN | 217176890 U | 8/2022 |
| WO | 2007134740 A1 | 11/2007 |

OTHER PUBLICATIONS

International Search Report and Written Opinion issued by the International Searching Authority in International Patent Application No. PCT/US24/12450, dated May 6, 2024.

*Primary Examiner* — David E Sosnowski
*Assistant Examiner* — Jason G Davis
(74) *Attorney, Agent, or Firm* — Polygon IP, LLP

(57) ABSTRACT

Aspect of the disclosure provides a method of pumping a liquid material. The method may include pumping the liquid material by rotating an impeller attached to a shaft assembly. The pump includes the impeller, the shaft assembly, and a pump chamber. The method includes controlling the minimum pressure of the liquid material in the pump chamber to be above a threshold pressure by controlling a pressure of a gas that is supplied to the pump chamber. The shaft assembly includes a first shaft and a second shaft that are separated by a gap and are physically coupled by a coupling component.

20 Claims, 10 Drawing Sheets

(56) References Cited

U.S. PATENT DOCUMENTS

| | | |
|---|---|---|
| 9,011,117 B2 * | 4/2015 | Thut .................. F04D 29/708 |
| | | 266/236 |
| 2002/0102159 A1 | 8/2002 | Thut |
| 2008/0080988 A1 | 4/2008 | Wahl et al. |
| 2013/0337221 A1 | 12/2013 | Brahmandam et al. |
| 2014/0369859 A1 | 12/2014 | Thut |
| 2015/0252807 A1 | 9/2015 | Cooper |
| 2019/0085858 A1 | 3/2019 | Boeglin |
| 2022/0263364 A1 | 8/2022 | Hopkins et al. |

* cited by examiner

CIRCULATION PUMP MADE FROM BRITTLE MATERIAL

INCORPORATION BY REFERENCE

The present application claims the benefit of priority to U.S. Provisional Application No. 63/480,891, titled "Centrifugal sump pump made from brittle materials," filed on Jan. 20, 2023, which is incorporated by reference herein in its entirety.

TECHNICAL FIELD

The present disclosure describes aspects generally related to fluid handling systems. For example, the fluid handling systems may involve heating or cooling, thereby involving thermofluid handling system that may be relevant for an energy storage system, such as a thermal energy storage system termed thermal batteries.

BACKGROUND

Thermal batteries may be grid scale rechargeable batteries that are intended to store electricity from renewables and enable greater penetration of renewable energy onto the grid. Thermal batteries may operate by taking electricity from the grid, from any source, converting the electricity to high-temperature sensible heat (e.g., 1900-2400° C.), and then storing the thermal energy in thermally well-insulated facilities until the energy is dispatched either as electricity or heat. When needed, the stored thermal energy may be converted back to electricity via thermophotovoltaics (TPV) or discharged as heat for an industrial process. Thermal batteries may be thermally-insulated and held inside an inert environment, such as an argon (Ar) filled environment.

SUMMARY

Aspects of the disclosure include methods and apparatuses related to pumping a liquid material. A method of pumping material may include pumping a liquid material by rotating an impeller. The impeller in one example implementation is attached to and rotated by a shaft assembly. The pump may include the impeller, the shaft assembly, and a pump chamber. The method may further include controlling the minimum pressure of the liquid material in the pump chamber to be above a threshold pressure by controlling a pressure of a gas that is supplied to the pump chamber.

In an example implementation, the method includes filling, at least via grooves in a bearing that surrounds a region of the shaft assembly, the liquid material between the bearing and the region to lubricate the bearing, the bearing being separated from the shaft assembly by the liquid material.

In an example implementation, the shaft assembly includes a first shaft attached to a motor in the pump, a second shaft attached to the impeller, and a coupling component that is physically attached to the first shaft and the second shaft. The first shaft and the second shaft may be separated by a gap along a shaft axis of the shaft assembly, and the coupling component may surround the first shaft and the second shaft.

In an example implementation, the method includes radiatively cooling the shaft assembly by surrounding a region of the shaft assembly with a cooling component that may have, for example, a cylindrical shape. An inner surface of the cooling component may be black and able to absorb thermal radiation from the shaft assembly, with the cooling component being cooled externally.

In an example implementation, vanes of the impeller are cut into a cylinder, and the ratio of the height of the cylinder to the diameter of the cylinder is above a threshold. In an example implementation, the impeller further has one or more openings on a bottom surface that extends perpendicularly to the cylindrical surface on one or both of its flat cases.

In an example implementation, the pump chamber is coupled to the shaft assembly using one or more springs.

In an example implementation, the pump further comprises one or more bearings that surround the shaft assembly, the one or more bearings being separated from the shaft assembly, and the shaft assembly, the impeller, and the one or more bearings are formed using a brittle material.

In an example implementation, the brittle material comprises graphite or carbon based materials.

In an example implementation, the gas comprises an inert gas.

The method may also include forming a gas-liquid interface between the liquid material and the gas by supplying the gas to the pump chamber. A position of the gas-liquid interface in the pump chamber may vary as a function of the gas pressure. For example, the liquid material may be positioned below the gas-liquid interface.

In an example implementation, the pumping comprises pumping the liquid material with a flow rate that is at least 0.1 or 1 gallons per minute, and the liquid material comprises liquid tin (Sn) having a temperature between 1000° C. and 3000° C.

A pump in accordance with on example implementation may include a motor configured to rotate a shaft assembly attached to the motor, the shaft assembly being configured to cause an impeller attached to the shaft assembly to rotate, the impeller being configured to transport a liquid material; an inlet for a gas to enter a pump chamber; and a control device configured to control a pressure of the gas in the pump chamber. The minimum pressure of the liquid material in the pump chamber may be above a threshold pressure. The gas-liquid interface may be formed between the liquid material and the gas, with a position of the gas-liquid interface in the pump chamber depending on the pressure of the gas, wherein the liquid material is positioned below the gas-liquid interface.

In an example implementation, the pump includes a bearing surrounding a region of the shaft assembly. The bearing may have a cylindrical shape and include one or more grooves on an inner surface of the bearing that are configured to transport the liquid material. The bearing may be separated from the shaft assembly by the liquid material. The diameter of the cylindrical portion of the bearing may be greater than a threshold diameter. The height of the cylindrical portion of the bearing may be larger than a threshold height.

In an example implementation, the pump may further include a cooling component configured to radiatively cool the shaft assembly by absorbing thermal radiation from the shaft assembly. The cooling component with a cylindrical shape may surround a region of the shaft assembly. An inner surface of the cylinder may be colored black, via a coating or material selection, such that the inner surface may have a high radiative absorptivity. For situations where the temperatures are sufficiently high such that a substantial portion of the light is visible, it can be advantageous for the inner surface to appear black. For applications where the predominant frequency range of light to be transferred via thermal radiation is in the infrared regime, and the inner surface is to have a high infrared absorptivity, the inner surface may also appear black in the visible spectrum, or may not. The cooling component may be cooled externally.

In an example implementation, vanes of the impeller are positioned on a cylindrical surface, with the ratio of the height of the cylindrical surface relative to the diameter of the cylindrical surface being above a threshold, and the impeller including one or more openings at a bottom surface that is perpendicular to the direction of extension of the cylindrical surface.

In an example implementation, the pump further comprises a bearing that surrounds the shaft assembly, the bearing being separated from the shaft assembly, and the shaft assembly, the impeller, and the bearing being formed using a brittle material. In an example implementation, one of the bearing or the shaft assembly has a coating formed on an outer surface thereof. The coating may include a diamond-like carbon material, and a thickness of the coating is less than a threshold thickness.

Additional advantages and novel features of these aspects will be set forth in part in the description that follows, and in part will become more apparent to those skilled in the art upon examination of the following or upon learning by practice of the disclosure.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Figure 1:
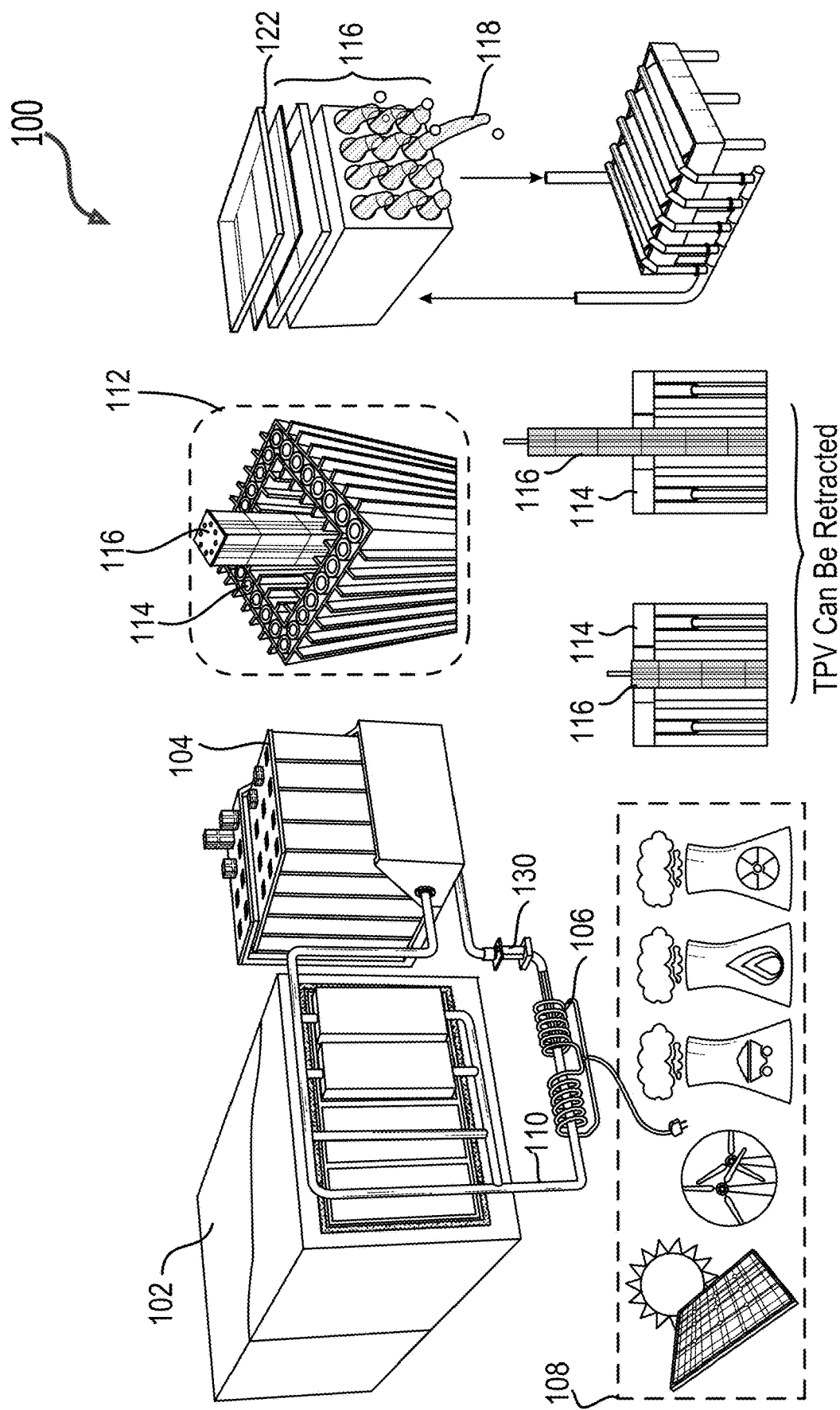
FIG. 1 shows an exemplary diagram of a thermal battery system in accordance with some aspects of the disclosure.

FIG. 1 shows an example thermal battery system (or thermal battery) 100 in accordance with aspects of the present disclosure. As shown in FIG. 1, the system 100 may include a storage unit 102 that includes a plurality of graphite blocks. The storage unit 102 may have a large size, such as 30 m×15 m×10 m. Each of the plurality of graphite blocks may have a nominal dimension, such as 0.6 m×0.6 m×2 m. The storage unit 102 in this example implementation is configured to store thermal energy. The system 100 may include a power block 104. The power block 104 may include an array of thermophotovoltaics (TPV) unit cell structures (or TPV cells) 112. Each TPV cell 112 may work in a same or similar way as normal solar photovoltaics (PV), via the photoelectric effect, to convert light (or photons) into electricity. Each of the TPV cells 112 may include an array of pipes 114 and a TPV device 116. As shown in FIG. 1, the TPV device 116 may further include a mirror 122 configured to reflect the light radiated from the pipes 114. The TPV device 116 may be cooled down by a liquid coolant 118, such as water. In an aspect, the TPV device 116 may be retracted (or removed) from the array of the pipes 114. The system 100 may further include a piping infrastructure 110 in which a fluid such as a liquid material, for example, a liquid metal (e.g., tin (Sn)), may flow between the storage unit 102 and the power block 104 for heat transfer. The system 100 may include heating elements 106 that are configured to heat up the liquid material, such as the liquid metal in the piping infrastructure 110. The system 100 may include a pump 130 that is configured to transport the liquid material in the piping infrastructure 110.

The inert environment may prevent oxidation of high-temperature materials used in the thermal batteries and allow the energy storage system to have a relatively long expected lifetime (e.g., >30 years). Furthermore, it can be used as fire suppression, or for fire/tamper prevention. In an aspect, the power and energy may be decoupled, such that the thermal batteries may be sized to have a 1 hour (hr), a 10 hr, a great than 100 hr discharge (or any duration in between approximately 1-1000 hrs), or the like. The energy storage system may be built using any suitable materials. In an aspect, the energy storage system may be built based on carbon and Sn. Sn may be used as a heat transfer fluid because, among other things, Sn does not chemically interact with the carbon at various temperatures used in the system 100. Thus, corrosion may be prevented, and the materials (e.g., Sn and carbon) of the energy storage system may remain in thermodynamic equilibrium with each other. Sn may be used because Sn has a low melting point (e.g., 232° C.), a high boiling point (e.g., 2602° C.), and weak oxidation. Thus, Sn may not pose a fire or explosion hazard like other metals, such as alkali metals. Furthermore, Sn is affordable, as Sn is much less expensive than metals having similar characteristics, such as gallium, and is available in large quantities, as Sn is the primary component of solders.

An example operation of the system (or thermal battery) 100 may include charging, energy storage, and discharging. In the charging step, the system 100 may be charged with electricity from any suitable source 108, such as the electrical source. In an aspect, the system 100 may be expected to operate using intermittent renewable energy, such as solar energy and wind energy that are representatively shown in the source 108. The heating elements 106 within the system 100 may radiatively transfer energy to the graphite piping infrastructure 110. The piping infrastructure 110 may contain liquid Sn, which may be pumped (e.g., mechanically pumped) through pipes of the piping infrastructure 110 by the pump 130, for example, when Sn is heated nominally from T1 (e.g., approximately 1900° C.) to a peak temperature T2 (e.g., approximately 2400° C.). Once heated, the Sn may be pumped through the graphite blocks of the storage unit 102 by the pump 130. The Sn flowing through the graphite pipes of the piping infrastructure 110 may radiatively transfer thermal energy to the graphite blocks of the storage unit 102. Once Sn passes through the storage unit 102, Sn may be rerouted back to the heating elements 106 to be reheated to T2 (e.g., approximately 2400° C.), thereby enabling continuous charging of the thermal battery system

100. When the large bank of graphite blocks in the storage unit 102 is fully heated, the thermal battery system 100 may be considered as fully charged.

In the energy storage step, given the large size of the storage unit 102 and that the storage unit 102 is thermally insulated from an outer environment using inert containment, the heat (interchangeably referred to herein as thermal energy) in the graphite blocks of the storage unit 102 may be kept (or stored) for a relatively long time (e.g., >1 month), for example, losing less than 1-5% of the energy stored each day.

In the discharging step, such as when electricity is needed, the thermal battery system 100 may discharge by pumping the liquid metal (e.g., Sn) with the pump 130 through the storage unit 102 towards the power block 104, which includes the array of TPV unit cell structures (or TPV cells) 112. The liquid metal (e.g., Sn) may be pumped through a parallel array of pipes 114, for example, that then radiate light to the TPV devices 116. In an aspect, the radiated light may be or include a terrestrial heat source that has a spectral peak in an infrared regime. The TPV cells 112 may convert the light emitted by the piping network (or array of pipes) 114, which, for example, may glow white hot, back to electricity. The TPV cells 112 may be efficient since the TPV cells 112 are designed to convert high frequency light, which may be converted most efficiently. The remainder of the light may pass through the TPV cells 112 because such light is transparent to the TPV cells 112. This remainder of the light may also be reflected from the mirror (e.g., a gold mirror or a silver mirror) 122 at a back of the TPV device 116. When the light reflects off the mirror 122, the reflected light may be reabsorbed by the hot infrastructure (e.g., the pipes 114) and preserved, enabling a high roundtrip efficiency (RTE) (e.g., ~50%). As the liquid metal (e.g., Sn) passes through the power block 104, some of the thermal energy of the liquid metal may be converted to electricity. Accordingly, the Sn may cool back to nominally T1 (e.g., about 1900° C.). The Sn may recirculate through the storage unit 102 to be reheated to T2 (e.g., 2400° C.). Thus, the thermal battery system 100 may be continuously discharged, such as to meet a grid demand.

Figure 2:
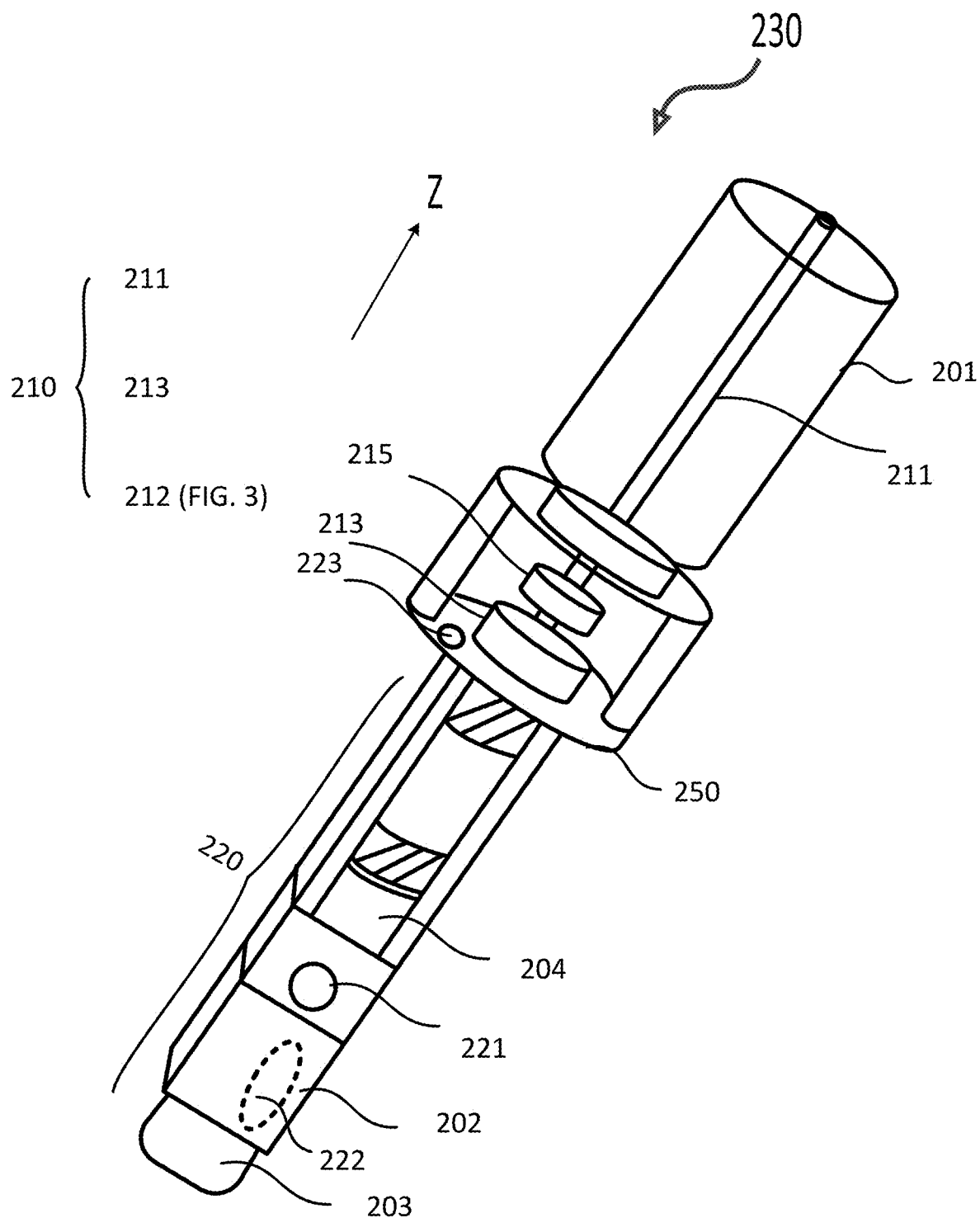
FIGS. 2-3 show an example of a pump according to an aspect of the disclosure.
Figure 3:
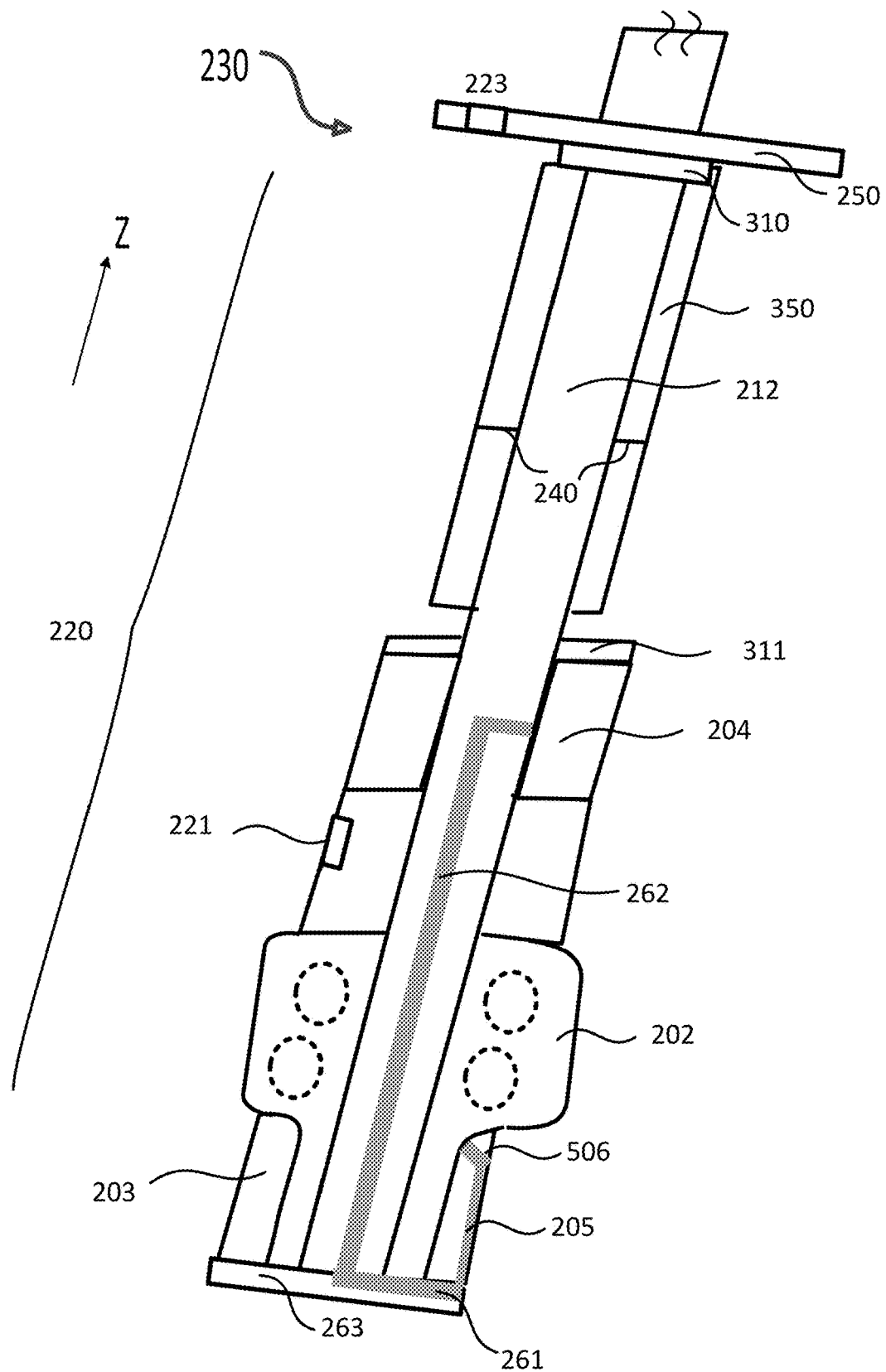

A pump may be used in a thermal battery system, such as in the system 100 in FIG. 1 to transport or move the liquid material, such as a heat transfer fluid (e.g., liquid Sn). FIGS. 2-3 shows an example pump 230 usable with aspects of the present disclosure. The pump 230 may be used in any suitable system, for example, to pump a liquid material with a high temperature (interchangeably referred to as an operating temperature) (e.g., a temperature that is above or equal to a temperature threshold, such as 1000° C.) and a high flow rate (e.g., a flow rate that is above or equal to a flow rate threshold, such as 1000 gallons per minute (gpm)). In an example, the pump 230 is used when the operating temperature is between 1000 to 3000° C. In an example, the pump 230 has a flow rate from 0.1 gpm to 100,000 gmp. In an example implementation, the pump 230 is used as the pump 130 in the system 100 in FIG. 1. The pump 230 may be a circulation pump (also interchangeably referred to herein as a circulator pump or a circulating pump). In an example implementation, the pump 230 may be a centrifugal pump. FIGS. 4-11 show example components in the pump 230 according to some aspects of the disclosure. Referring to FIGS. 2-3, the pump 230 may include a motor 201, a shaft assembly 210, an impeller 202, one or more bearings (e.g., bearings 203-204), a pump chamber 220, and/or the like. The pump 230 may be formed of graphite, other carbon allotropes, ceramics such as alumina, silicon carbide, silicon nitride or zirconia, metal (such as stainless steel, tungsten, or the like), and/or the like. In an example implementation, the shaft assembly 210, the impeller 202, the bearings 203-204, and the pump chamber 220 may be formed of graphite. In an example implementation, the shaft assembly 210 is formed using graphite and stainless steel.

The shaft assembly 210 may be attached to the motor 201 and the impeller 202. The motor 201 may be configured to rotate the shaft assembly 210. The shaft assembly 210 may be configured to cause the impeller 202 to rotate. The impeller 202 may be configured to transport the liquid material (e.g., liquid Sn).

Referring to FIGS. 2-3, the pump chamber 220 may be configured to have an inlet 221 and an outlet 222. The liquid material may enter the pump chamber 220 via the inlet 221, and may exit the pump chamber 220 via the outlet 222. The inlet 221 and the outlet 222 may have any suitable sizes and may be positioned at any suitable locations in the pump chamber 220. In an example implementation, the inlet 221 has a circular cross-sectional shape to accept a circular tubing. In an example implementation, the outlet 222 has an oval shape. In the example shown in FIG. 2, the inlet 221 and the outlet 222 are positioned on opposite sides of the pump chamber, e.g., the inlet 221 is positioned on a front side as shown, and the outlet 222 is positioned on a back side. Referring to FIG. 2, the outlet 222 is positioned below the inlet 221 along a shaft axis Z.

In some example implementations, when the impeller 202 rotates, the liquid material (e.g., liquid Sn) in the pump chamber 220 may be caused to flow, for example, resulting in a pressure difference between the suction and discharge of the pump 230. The pressure difference may be between a first pressure P1 at the inlet 221 and a second pressure P2 at the outlet 222. In this example, P2 is larger than P1, and thus the liquid material may be drawn to the inlet 221, may enter the pump chamber 220, and may be forced to exit the outlet 222 at P2. Since P2 is high, the liquid material may overcome friction and the like and circulate in pipes connected to the pump 230. In an example implementation, the pressure difference (P2–P1) is relatively small, such as less than 100 pound per square inch (psi). Thus, the application of the pump 230 in the system 100 may be classified as a high flow rate with a relatively low-pressure difference (e.g., in a sub-100 psi range). In an example implementation, P2 is between 50 to 100 psi to lubricate the bearings 203-204.

Referring to FIGS. 2-3, the pump 230 may also include an inlet 223 for a gas to enter the pump chamber 220. The inlet 223 may be positioned at any suitable location in the pump chamber 220 and may have any suitable size. A control device (not shown) may be configured to control a pressure of the gas in the pump chamber 220.

Applications of the system 100 may have certain requirements for the pump 230, for example, including having a large flow rate (e.g., the flow rate≥a threshold flow rate, such as 1000 gallons per minute) and a high operating temperature (e.g., ≥the temperature threshold). In some example implementations, the system 100 including the pump 230 may be contained within an inert environment (e.g., filled with an inert gas, such as Ar), and thus the requirements for the pump 230 may include low maintenance, a prolonged lifetime for the pump 230, and/or the like to avoid breaching the inert environment. The requirements for the pump 230 may include mechanical stability of the pump 230. The present disclosure describes various examples of components in the pump 230 and/or methods of using the pump 230 to meet the requirements above.

In some example implementations, a pump may include a dynamic seal configured to retain fluids and contain pressure within a mechanical system. On the other hand, a dynamic seal needs to be replaced when the dynamic seal wears out. For a pump housed in an inert environment, in some example implementations, the inert environment may be breached to replace the dynamic seal. For example, an atmospheric environment may be used for a person to replace the dynamic seal. Thus, it may be convenient and cost saving for a pump held in an inert environment to be seal-less (e.g., not to include a dynamic seal), thereby avoiding the periodic maintenance associated with replacing the dynamic seal. According to some aspects of the disclosure, the pump 230 may not include a dynamic seal against the liquid material and may be seal-less. Referring to FIGS. 2-3, a gas-liquid interface 240 may be formed between the liquid material in the pump chamber 220 and a gas by supplying the gas (e.g., an inert gas such as Ar) to the pump chamber 220 via the gas inlet 223. Alternatively, a shaft seal may be formed.

In an example implementation, the gas-liquid interface 240 may be formed during operation of the pump 230 when the impeller 202 causes sufficient pressure P2 at the outlet 222 and when the gas is filled via the inlet 223. The pressure P2 at the outlet 222 may force the liquid material to exit the outlet 222 and fill a cavity between the second shaft 212 and a housing 350 of the second shaft 212, for example, by moving downwards and upwards, as shown in FIGS. 2 and 3. A height of the gas-liquid interface 240 in the pump chamber 220 may depend on various factors, such as a pressure of the gas, a pressure of the liquid material (e.g., P2), and/or the like. In the example shown in FIGS. 2 and 3, the gas-liquid interface 240 may be above the outlet 222 due to the pressure P2.

The gas-liquid interface 240 may separate the gas and the liquid material. The liquid material may be positioned below the gas-liquid interface 240. For example, the liquid material may move up to a level or a height that is at the height of the gas-liquid interface 240, and no liquid material may be above the gas-liquid interface 240. The gas may be above the gas-liquid interface 240, and no gas may be below the gas-liquid interface 240.

The liquid material, such as liquid Sn, may be electrically conductive. The height of the gas-liquid interface 240 may be determined based on resistivity measurements at various locations in the pump chamber 220.

In the example shown in FIG. 3, the gas-liquid interface 240 may function as a seal by retaining the liquid material below the gas-liquid interface 240, and may also be interchangeably referred to herein as a gaseous-liquid interface seal or a gaseous seal.

In an example implementation, the pump 230 may be located in an inert environment filled with an inert gas (e.g., Ar). The gas that is supplied to the pump chamber 220 may include the inert gas from the inert environment. The gas pressure used to form the gas-liquid interface 240 may be controlled to adjust the height of the gas-liquid interface 240 along the shaft axis. An increase of the gas pressure may lower the liquid material and reduce the height of the gas-liquid interface 240.

Cavitation may refer to a phenomenon in which a pressure of a liquid material reduces to below a vapor pressure of the liquid material, forming vapor-filled cavities in the liquid material. The cavities may collapse and damage the pump 230, pipes used to transport the liquid material, and/or the like. Thus, aspects of the disclosure describe various features and/or methods to prevent or reduce cavitation, and thus prolonging the lifetime of the pump 230.

As described above, the pressure of the gas (e.g., the inert gas) may be controlled externally, for example, by linking the pump chamber 220 where the lubricating liquid material is located with a pressurized gas source. For example, the gas (e.g., Ar) from the pressurized gas source may enter the pump chamber 220 from the inlet 223. Thus, the pressure of the liquid material in the pump chamber 220 may be controlled (e.g., increased or decreased) to control the height of the liquid level along the shaft axis. In an example implementation, the height of the liquid level may be identical or close to the height of the gas-liquid interface 240.

In some example implementations, the pressure of the liquid material in the pump chamber 220 may vary with a location of the liquid material in the pump chamber 220. The pressure may vary from a minimum pressure $P_{min}$ to a maximum pressure $P_{max}$ in the pump chamber 220. The pressures of the liquid material including the minimum pressure $P_{min}$ may be controlled by using the gas pressure (e.g., 10 to 20 psi). In an example, the gas pressure may range from 0.1 to 1000 psi. In an example implementation, a total pressure of the liquid material may be determined based on the pressure of the liquid material without the gas and the gas pressure. When the gas pressure is increased, $P_{min}$ that the liquid material experiences may be increased. When $P_{min}$ of the liquid material is above the vapor pressure of the liquid material, cavitation may be prevented. Preventing cavitation may increase the operating temperature range (e.g., temperatures closer to the boiling point of the liquid material) of the pump 230 and/or the system 100. As a result, the pump 230 may have an extremely long life, with less maintenance, as there is no obvious degradation mechanism associated with the pump 230.

The requirements for the pump 230 may include mechanical stability of the pump 230. When the pump 230 operates, the impeller 202 may experience two kinds of loads, including a lateral load (also interchangeably referred to as a radial load) where the impeller 202 is pushed laterally (e.g., perpendicular to the shaft axis Z) because of the pressurization of the fluid, and an axial load (also interchangeably referred to as a thrust load, e.g., along the shaft axis Z) that, for example, pushes upwards on the shaft assembly 210 and the motor 201, or in some configurations it may pull downwards away from the motor 201.

The thrust load may be mitigated using one or more thrust bearings. The one or more thrust bearings may be formed using graphite, or may be strategically located outside of the high temperature zone (e.g., the hot zone), so that other materials that may not be chemically compatible or rated for high temperature can be used. The one or more thrust bearings may have a disc shape. The one or more thrust bearings may be positioned in any suitable location(s) in the pump 230. In an example implementation, the thrust bearing may be positioned out of the hot zone, and the thrust bearing may be closer to the motor 201. Thus, the thrust bearing may be readily replaced more easily because the thrust bearing is not hot and may be replaced in the cold zone. In an example, the pump 230 includes the thrust bearing 310 shown in FIG. 3. The thrust bearing 310 may be located in the cold zone or closer to the cold zone. Having a single thrust bearing such as the thrust bearing 310 may result in less maintenance and cost saving. In an example implementation, the pump 230 includes thrust bearing 310 and thrust bearing 311 that is above the bearing 204 as shown in FIG. 3. Referring further to FIG. 3, the thrust bearing 310 may be located in the cold zone or closer to the cold zone, while the thrust bearing 311 may be located in the hot zone.

The radial load may be mitigated using rotary bearings, such as journal bearing(s) or sleeve bearing(s) (e.g., the bearings 203-204 shown in FIG. 3). The bearings 203-204 may be plain bearings. The bearings 203-204 may be configured to surround respective regions of the shaft assembly 210, such as respective regions of the second shaft 212. The bearings 203-204 may have a cylindrical shape. The bearings 203-204 may also be interchangeably referred to herein as a bottom bearing and a top bearing, respectively, according to respective heights of the bearings 203-204. According to an aspect of the disclosure, hydrodynamic lubrication may be used to lubricate the bearings 203-204.

Hydrodynamic lubrication may refer to a situation in which two rubbing surfaces are separated by a thin film of a lubricant. Hydrodynamic lubrication may eliminate or reduce friction and/or wear of rubbing solids via a liquid lubricant. In the present disclosure, the bearings 203-204 may be located about the second shaft 212. In an example implementation, a gap between the second shaft 212 and inner surfaces of the bearings 203-204 may be filled with the liquid material, and thus, friction between the bearings 203-204 and the second shaft 212 may be reduced or eliminated by eliminating or reducing surface-to-surface contact (interchangeably referred to as solid-to-solid contact) between the second shaft 212 and the bearings 203-204 via action of fluid dynamic effects. Accordingly, the bearings 203-204 may thereby be hydrodynamically lubricated.

In some example implementations, hydrodynamical lubrication of the bearings 203-204 may be challenging, for example, due to a size of the pump 230. For example, if the size (e.g., a diameter or a dimension) of the impeller 202 is larger than a pump diameter threshold, and thus tolerance requirements (e.g., how tightly the bearings 203-204 and the second shaft 212 are positioned with respect to each other) may be more difficult to meet.

Various aspects of the disclosure describe bearing characteristics that enable the hydrodynamical lubrication of the bearings 203-204 in the pump 230 when the pump 230 has a large size, such as the diameter of the pump 230 is larger than the pump diameter threshold. In an aspect of the disclosure, large dimensions (e.g., a large diameter, for example, larger than the shaft diameter, or in some cases even larger than the impeller diameter) may be used for the bearings 203-204, for example, to relax the tolerance requirements. In some examples, the liquid material, such as liquid Sn, may not lubricate surfaces of the bearings 203-204 well. To facilitate the lubricating process, the bearings 203-204 may be designed to be hydrodynamic types of bearings, thereby allowing the liquid material to lubricate the surfaces of the bearings 203-204 well.

Figure 4:
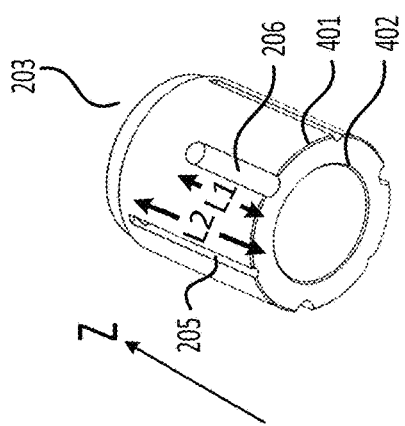
FIG. 4-6 show an example of a bearing in the pump according to an aspect of the disclosure.

FIG. 4 shows a perspective view of an example bearing 203 usable in accordance with aspects of the present disclosure. The bearing 203 may have an outer surface 401 and an inner surface 402. The outer surface 401 and the inner surface 402 may have a cylindrical shape. The diameter $D_B$ of the bearing 203 may be large, e.g., larger than the shaft diameter (e.g., a diameter of the second shaft 212), or in some cases even larger than the impeller diameter (e.g., $D_1$ shown in FIG. 14), to spread the load over a larger surface and increase the velocity of the fluid in the gap in order to produce a higher pressure to counter the radial shaft load. Furthermore, large bearings can enable the usage of a larger gap, thereby loosening the tolerance requirements. In an example, a height of the bearing 203 may be large, e.g., larger than the shaft or in some cases even the impeller diameter, to relax the loading and tolerance requirements. When the diameter $D_B$ and/or the height of the bearing 203 are large, the radial load may be spread over a larger surface area, thereby reducing the required pressure of the fluid supplied in the gap, and the fluid to be supplied to the bearings to fill the gap.

In hydrodynamic lubrication, the radial load may be balanced by a pressure of the liquid material that is applied to the surface area of the bearing 203 to keep the shaft assembly 210 stabilized. Thus, the pressure of the liquid material and/or the surface area of the bearing 203 may be increased to facilitate the hydrodynamic lubrication. Further, when the radius or the diameter increases, a speed of the liquid material may increase for the same rotational speed of the shaft assembly 210, and thus increasing the pressure.

One or more grooves, such as grooves 205-206 may be formed over the outer surface 401. The grooves 206 may have a first length L1 along the shaft axis. The grooves 205 may have a second length L2 along the shaft axis. L2 may be identical to or different from L1. In the example shown in FIG. 4, L2 is larger than L1.

Figure 5:
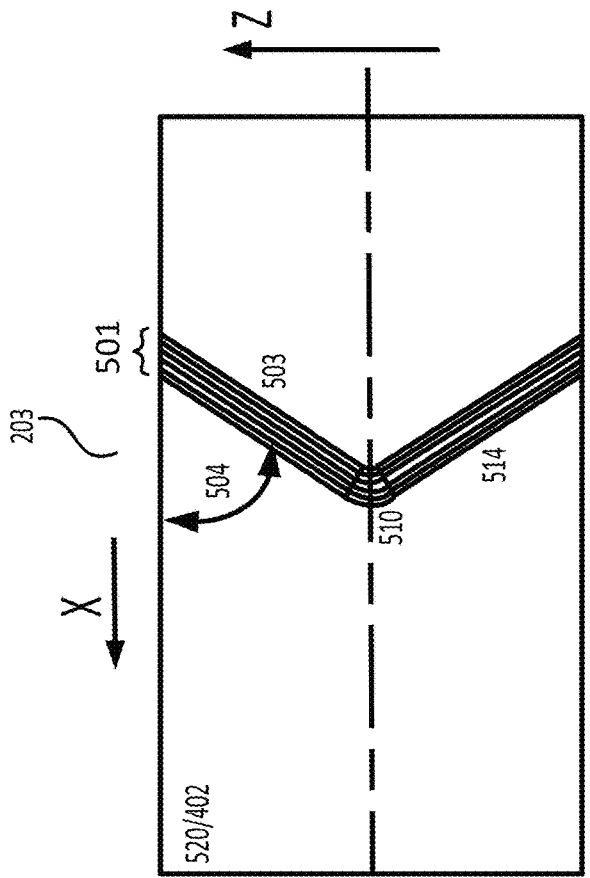

FIG. 5 shows a representatively depicted unrolled, flat view of the inner surface 402 of the bearing 203 of FIG. 4, according to an aspect of the disclosure, so that the cylindrical inner surface 402 may be depicted as a planar surface 520. The inner surface 402 may include a groove structure 501 to facilitate the delivery and/or distribution of the liquid or lubricant material that may be liquid or gas on the inner surface 402, and to facilitate the liquid or lubricant material being spread over the surfaces of the bearing 203 more easily. Groove characteristics of the groove structure 501 over the inner surface 402 may include groove angle, groove direction, number of times that the groove structure 501 changes direction, groove depth into the bearing 203, number of grooves in the groove structure 501, positioning of the groove structure 501 at specific location(s), and the like. The groove characteristics may be designed to facilitate the spread of the liquid material over the inner surface 402.

The groove structure 501 may include one or more individual grooves. In the example implementation shown in FIG. 5, the groove structure 501 may have a groove direction 503 that forms a groove angle (e.g., 60°) 504 with a flow direction (e.g., a representative X axis perpendicular to the shaft axis when the surface is viewed in its cylindrical orientation). The groove direction 503 of the groove structure 501 may change, for example, at a position 510 in the surface 520 into a groove direction 514.

Figure 6:
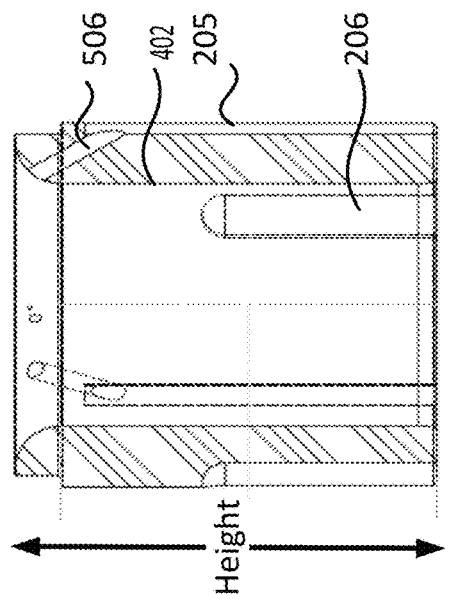

FIG. 6 shows a cross-sectional view of the bearing 203 of FIG. 4, according to an aspect of the disclosure. Referring to FIGS. 3 and 6, in an example implementation, a channel or a passage 506 is formed between the inner surface 402 and the groove 205 on the outer surface 401 to facilitate movement of the liquid material between the inner surface 402 and the outer surface 401.

Figure 8:
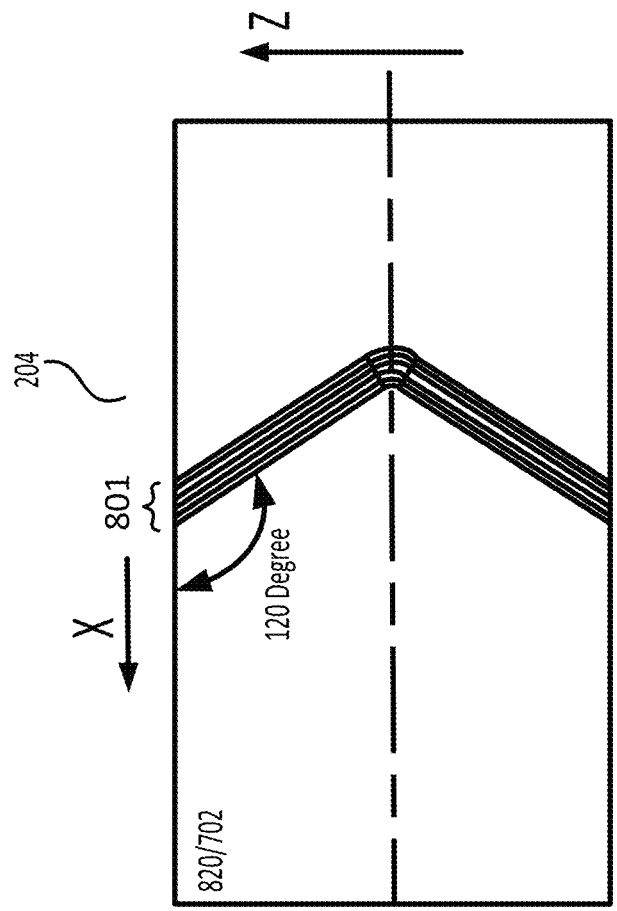
FIGS. 7-8 show an example of a bearing in the pump according to an aspect of the disclosure.
Figure 7:
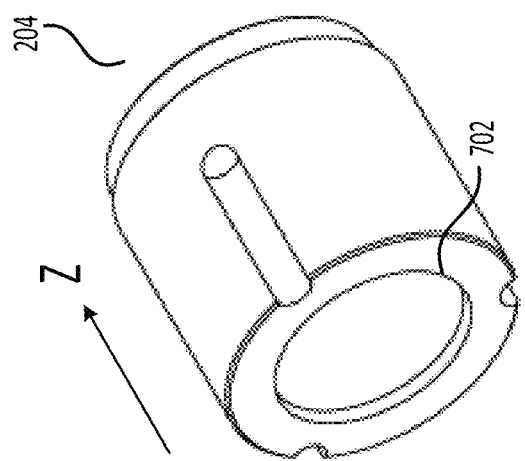

Other radial bearings, such as the bearing 204, may be designed in a similar way. The other radial bearings may have similar or different groove characteristics to facilitate the distribution of the liquid material over various contacting surfaces of the other bearings. FIG. 7 shows a perspective view of an example of the bearing 204. FIG. 8 shows a representatively depicted unrolled, flat view of an inner surface 702 of the bearing 204 of FIG. 7, according to an aspect of the disclosure, so that the cylindrical inner surface 702 may be depicted as a planar surface 820. In an example implementation, the groove characteristics of a groove structure 801 for bearing 204 may differ from the groove characteristics of the groove structure 501 on bearing 203.

Similar features for bearing 203, along the lines described above, may be suitably adapted to the bearing 204.

As shown in FIG. 2, during operation, the impeller 202 may rotate. The liquid material may enter the pump chamber 220 via the inlet 221, with the liquid material having a pressure P1. The pump 230 may cause the liquid material to exit from the outlet 222 at a pressure P2. The pressure P2 may be larger than pressure P1, and an area around the outlet 222 may include a high-pressure area where the liquid material around and at the outlet 222 may have a higher pressure than pressure experienced by the liquid material located at other areas (e.g., at and around the inlet 221) in the pump chamber 220. The liquid material may be forced through the outlet 222 and passthrough the surfaces of the bearing 203. Referring to FIGS. 3 and 6, the liquid material may pass through the passage 506 of the bearing 203, into the grooves 205, and thereby lubricate the bearing 203 and the shaft assembly 210. A lubrication path or a flow path between the bearings (e.g., 203-204) and the second shaft 212 may thereby include the passage 506 and grooves 205.

In an example implementation, referring to FIG. 3, the lubrication path may further include a passage 261 that communicates with groove 205 and a groove 262 that communicates with the passage 261. In an example implementation, an opening such as a hole of the passage 261 may align up with the passage formed partially by the groove 205 in bearing 203. In an example implementation, the passage 261 is formed on a surface of a thrust bearing 263 that is disposed below the shaft assembly 210 (e.g., the second shaft 212). The shaft assembly 210 may disposed about the thrust bearing 263. The groove 262 may be formed in the shaft assembly 210, such as the second shaft 212, for example, on an outer surface of the second shaft 212. The liquid material may be driven upward, as shown in FIG. 3, so as to move along the groove 262, for example, to a level that is above the outlet 222 (FIG. 2) due to the high pressure P2 occurring at the outlet 222. The liquid material from the groove 262 may thereby lubricate the bearing 204 (e.g., a plain bearing).

If the pump 230 is not in operation, the shaft assembly 210 may rest on the thrust bearing 263. As the shaft assembly 210 starts to rotate, the shaft assembly 210 may experience an upward force, and thus a load on the bottom bearing 263 may be reduced compared with the load when the pump 230 is not in operation.

As described above, the bearing 203 may be designed and formed to operate at a specific high temperature range (e.g., between 1900 and 2400° C.) within a specific range of a large flow rate and under a specific range of the pressure drop. Further, as the bearing 203 is large, for example, the diameter and/or the height of the bearing 203 may also be large to increase a surface area of the bearing 203. Such larger surface area may facilitate the hydrodynamical lubrication process, among other advantages.

As shown in FIGS. 2-3, the pump 230 may be a seal-less pump and may allow the liquid material (e.g., liquid Sn) being pumped thereby or therein to escape into the pump chamber 220 where the bearings (e.g., the bearing 203-204) may be located. In an example implementation, the movement (e.g., the leakage) of the liquid material along the lubrication path (e.g., including along the shaft assembly 210) may be intentional and may be used to lubricate the bearings 203-204. The liquid material itself may hydrodynamically lubricate the bearings 203-204 and may prevent a solid-solid contact between a rotating parts (e.g., parts of the shaft assembly 210) and non-rotating or partly non-rotating part(s) (e.g., the bearings 203-204 or non-rotating portions of the bearings 203-204), for example, a thin film may be formed between the shaft assembly 210 and the bearings 203-204 and may prevent the shaft assembly 210 from directly contacting the sides of the bearings 203-204. In an example implementation, the pump 230 and the system 100 may be located within an inert environment that does not contain oxygen (e.g., a very low oxygen partial pressure less than 1000 parts per million). The inert environment may be free from oxides, small particles, and the like. Accordingly, no or few solid particles may be disposed between the shaft assembly 210 and the bearings 203-204, and this feature may further help prevent or reduce the solid-solid contact between the shaft assembly 210 and other solids, such as the bearings 203-204, solid particles (e.g., oxides), and/or the like. Thus, the bearings 203-204 may last a longer lifetime, as a result, thereby helping to minimize maintenance on the pump 230 (e.g., replacing bearings or components over time). As the operating temperature may be high, the pump 230 may be cooled to improve performance, thereby also beneficially reducing the need for maintenance.

As described above, the solid-to-solid contact between the rotating part (e.g., the shaft assembly 210) and the non-rotating part(s) (e.g., portions of the bearings 203-204) may be minimized or eliminated by operating the pump 230 in the inert environment and by utilizing hydrodynamic lubrication. In an example implementation, if the rotating part (e.g., the shaft assembly 210) and the non-rotating part(s) (e.g., the non-moving portion of the bearings 203-204) still have a certain amount of the solid-to-solid contact, additional methods and/or features may be used to protect the rotating part (e.g., the shaft assembly 210) and the non-rotating part(s) (e.g., the non-rotating portions of bearings 203-204), for example, by coating the shaft assembly 210 and/or the bearings 203-204 material(s). Further, wear may be prevented by coating solid parts in the pump 230 with individual or combinations of hard material(s), for example including but not limited to diamond like carbon coatings, pyrolytic carbon, carbides or their alloys such as silicon carbide, zirconium carbide or titanium carbide, nitrides such as silicon nitride, aluminum nitride, titanium nitride, silicide, borides or various oxides, in addition to refractory metals such as tungsten.

The solid parts may include the shaft assembly 210 or a portion of the shaft assembly 210, bearing(s) (e.g., the bearings 203-204), and/or the like. One or more of the bearing(s) may have a coating formed thereon, for example, on an inner surface of the bearing. A portion of the shaft assembly 210 (e.g., the first shaft 211 and/or the second shaft 212) may include a coating formed thereon, for example, on an outer surface of a portion of the shaft assembly 210. The coating may include a hardening material, such as diamond-like carbon (DLC) material or the other aforementioned hard materials. In an example, the DLC material may include carbon. The DLC may include a pyrolytic graphite coating that forms or provides a hard surface. The DLC may include Zirconium carbide, Titanium carbide, silicon carbide, and/or the like. The thickness of the coating may be less than a threshold thickness (e.g., 200 microns), and thus does not affect tolerance requirements of the pump 230. In an example implementation, the thickness of the coating may be from about 25 to 50 microns. Alternatively, the thickness of the coating may be accounted for in the dimension selection for the components, which may enable coating thickness larger than 200 microns up to centimeters.

In an example implementation, the coating material (e.g., a softer graphite) may be softer than the material used to form the shaft assembly 210. In an example, the coating material may be softer than the material used to form the bearings. Thus, the coating material on the shaft assembly 210 and/or the bearings may wear away while the bearings and/or the shaft assembly remain protected and do not wear away. For example, the shaft assembly 210 and/or the bearings 203-204 may be coated with material(s) that are softer than material(s) used to form the shaft assembly 210 and/or the bearings 203-204. If one of the shaft assembly 210 and/or the bearings 203-204 is easier to replace, that shaft assembly 210 and/or the bearing 203-204 may be coated with the softer material(s). Thus, the soft material(s) coating the one of the shaft assembly 210 and/or the bearings 203-204 that is easier to replace may serve as the wear element, while another shaft assembly 210 and/or bearing 203-204 components do not wear out.

Alternatively, both the shaft assembly 210 and the bearings 203-204 may be coated with hard materials to reduce the wear rate.

Different parts of the pump 230 may be located in different temperature zones, for example, including a first temperature zone (e.g., a cold zone) within a first temperature range and a second temperature zone (e.g., a hot zone) within a second temperature range. Referring to FIG. 2, the motor 201, a first portion of the shaft assembly 210 enclosed by the motor 201, and/or the like may be located in the first temperature zone. The impeller 202, the bearings 203-204, a second portion of the shaft assembly 210 surrounded by the impeller 202, and/or the like may be located in the second temperature zone. A second temperature in the second temperature range may be higher than a first temperature in the first temperature range. The second temperature may be larger than or equal to 10 times that of the first temperature, for example. In an example implementation, the second temperature may be at least 1900° C., and the first temperature may range from room temperature to 200° C.

To accommodate the above requirements, various thermal separation features, cooling features, thermal expansion features, and/or the like may be employed. Various methods and apparatuses may be used to reduce thermal conductivity or increase a thermal resistance of components, such as the shaft assembly 210. The thermal conductivity of the shaft assembly 210 may be increased by increasing the length of the shaft assembly 210, by reducing cross-sectional area(s) at respective locations along the shaft axis Z of the shaft assembly 210, by using material(s) having a low thermal conductivity, and/or the like. In an example implementation, the shaft assembly 210 may be long. The length may be extended to achieve better thermal isolation between the section containing the motor 201 and the section that contains the fluid and delivers pump action. For example, the ratio of the shaft length to diameter may be larger than 100, to form a long shafted pump, which may be useful in situations where a tall reservoir is used to contain the liquid, such that the pump serves as a sump pump. Furthermore, the pump or the shaft assembly may include multiple impellers, which may be staged in a way that allows for sequential increases in pressure, thereby allowing the pump to achieve considerably higher pressures than what may be achieved with a single impeller.

Figure 9:
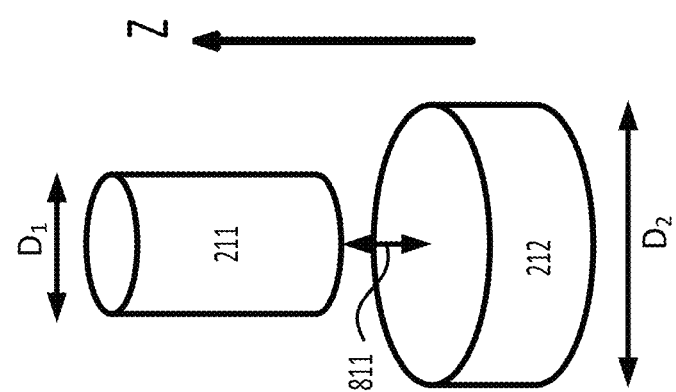
FIG. 9 shows an example of a gap between a first shaft and a second shaft in the pump according to an aspect of the disclosure.

In an example implementation, the shaft assembly 210 may include multiple shafts that are disconnected or are physically separated by gaps, for example, thereby reducing the direct material contact to 0 to reduce the effective cross-sectional area(s) for heat conduction and/or to increase the overall heat conduction length, so as to increase the net thermal resistance. Referring to FIGS. 2, 3, 9, and 10, the shaft assembly 210 may include a first shaft 211, a second shaft 212, and a coupling component 213. Referring to FIG. 9, the first shaft 211 and the second shaft 212 may be separated by a gap 811. A size of the gap 811 may be determined, for example, based on T1 and T2, the strength of the shaft assembly 210, coupling ability of the coupling component 213, and/or the like. For example, a larger gap 811 may be used for a higher T2. On the other hand, a smaller gap 811 may help the mechanical coupling operation between the first shaft 211 and the second shaft 212.

The coupling component 213 may be configured to couple or physically connected the first shaft 211 and the second shaft 212. The coupling component 213 may include any suitable components, such as flange(s), chain(s), and/or the like. The coupling component 213 may have a double chain style coupling, for example. In the example shown in FIG. 10, the coupling component 213 includes a flange 821 and chains 822 that are configured to provide mechanical stability to the shaft assembly 210. The flange 821 and the chains 822 may enclose the first shaft 211 and the second shaft 212 such that the rotation of the first shaft 211 may cause the second shaft 212 to rotate simultaneously. The flange 821 and the chains 822 may hold the first shaft 211 and the second shaft 212 together. In an example implementation, the first shaft 211 is formed of or comprises stainless steel. In an example, the second shaft 212 is formed of or comprises graphite. The chain coupling can provide additional flexibility in the shaft assembly 210 if there is misalignment.

Figure 10:
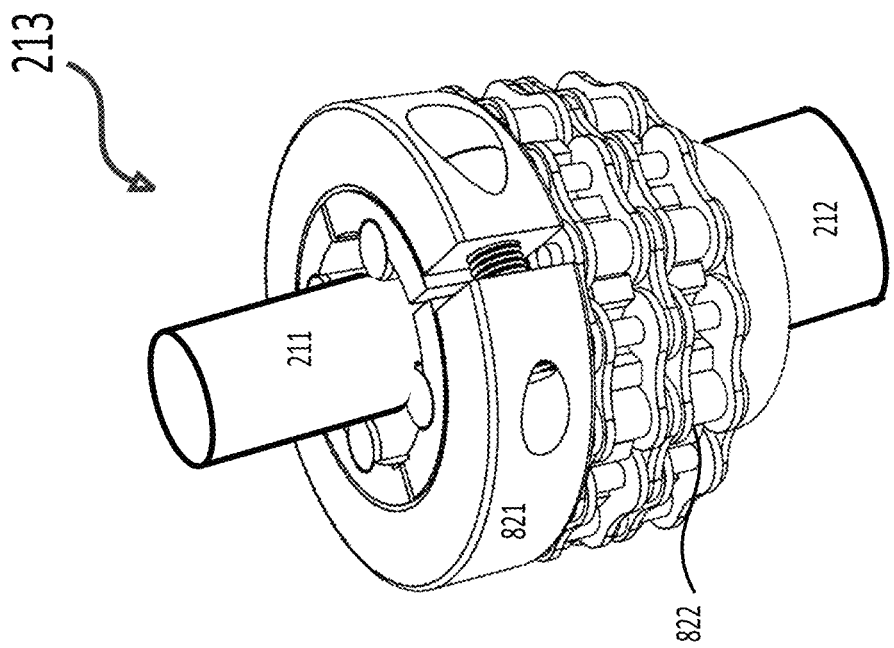
FIG. 10 shows an example of a coupling component in the pump that couples the first shaft and the second shaft according to an aspect of the disclosure.

From a thermal resistivity standpoint, referring to FIGS. 9-10, heat travels up along the shaft axis Z of the second shaft 212, travels radially to the coupling component 213, travels up along the coupling component 213, and then travels radially inward to the first shaft 211. Thus, the thermal conduction path may be elongated and thermal resistance may be increased, thereby reducing the rate of heat transfer from the second shaft 212 located in the hot zone to the first shaft 211 in the cold zone.

Breaks may be used in the shaft assembly 210 to limit or reduce a cross-sectional area (e.g., an area that is perpendicular to the Z axis) available for heat transfer and thus create a larger thermal resistance. In an example implementation, the first diameter D1 of the first shaft 211 is reduced to increase the thermal resistance of the first shaft 211, for example, D1 is less than a second diameter D2 of the second shaft 212. One or more portions of the shaft assembly 210 may be removed to reduce the cross-sectional area(s) at the respective position(s). For example, a portion may be removed from the first shaft 211 to further enlarge the thermal resistance (i.e., for example by hollowing the first shaft 211).

In an example implementation, the shaft assembly 210 may be formed from a low thermal conductivity material or a combination of materials having variable thermal conductivity that may cooperatively transmit the mechanical work to the impeller 202 from the motor 201 while limiting thermal conduction transfer from the second temperature zone to the first temperature zone (which may include the motor 201), for example. The shaft assembly 210 may include brittle materials, such as a ceramic material, amorphous carbon, graphite, and/or the like.

Figure 12:
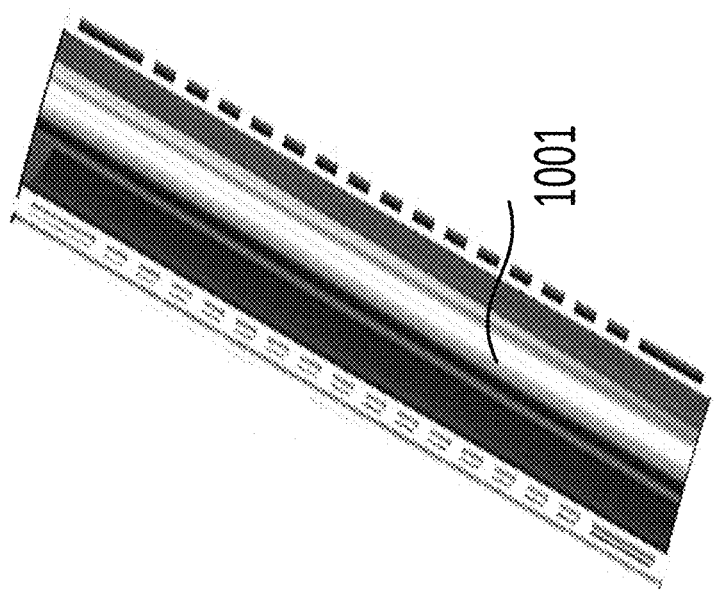
FIGS. 11-12 shows an example of a cooling component in the pump according to an aspect of the disclosure.
Figure 11:
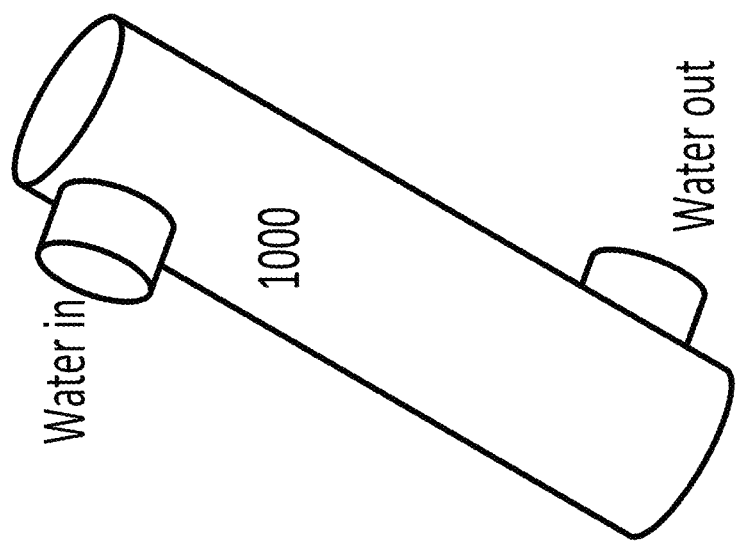

The pump 230 may include any suitable components and/or use any suitable methods for cooling. In an example implementation, a non-contact cooling method, such as use of radiatively cooling features, may be utilized, for example, to cool a region of the shaft assembly 210. Referring to FIGS. 2, 11, and 12, a region of the shaft assembly 210 may be surrounded by a cooling component 1000, for example, having a generally cylindrically shaped body. An inner surface 1001 (see FIG. 12) of the cooling component 1000 may be black (e.g., painted black) to help absorb radiation such as thermal radiation (e.g., light) received from the shaft assembly 210. The inner surface 1001 may be colored black, via a coating or material selection, such that the inner surface 1001 may have a high radiative absorptivity to the radiation from the shaft assembly 210. In an example, the temperature is sufficiently high such that a substantial portion of the radiation (e.g., the light) is visible, it can be advantageous for the inner surface 1001 to appear black. In an example, the predominant frequency range of light to be transferred via thermal radiation is in the infrared regime, and the inner surface 1001 is to have a high infrared absorptivity, and the inner surface 1001 may appear black in the visible spectrum, or may not. In an example implementation, the cooling component 1000 may be cooled externally, such as being water-cooled. The cooling component 1000 may also have or comprise a cooling sleeve. The cooling component 1000 may have an outer steel shell that is stationary, for example. The outer steel shell may include cooling water or cooling oil channels that may be used to cool the cooling component 1000. In an example implementation, the length of the cooling component 1000 along the shaft axis may be about one foot. In an example, the cooling component 1000 surrounds a bottom portion of the first shaft 211 and a top portion of the second shaft 212. The cooling component 1000 may decrease the temperature of the second shaft 212 to a much cooler level before switching to different materials (e.g., metal) used in the first shaft 211 and the motor 201 in the cold zone.

Figure 13:
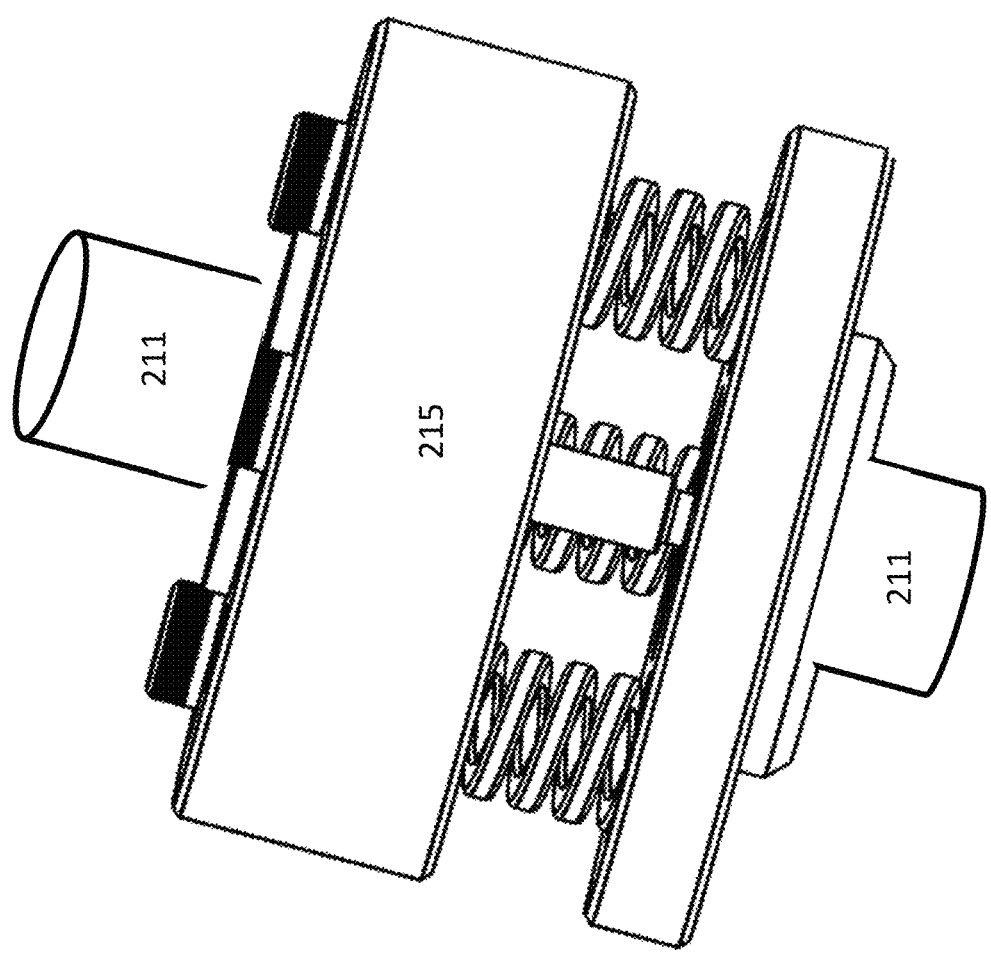
FIG. 13 shows an example of a spring connection in the pump according to an aspect of the disclosure.

In an aspect of the disclosure, thermal expansion where dimension changes with different components could occur may be accommodated, for example, by using a spring connection 215, as shown in FIG. 2. Referring to FIG. 2, the shaft assembly 210 may have a relatively large thermal expansion, such as 0.5 inches, due to the length of the shaft assembly 210, the temperature change that the shaft assembly 210 experiences during operation, the material(s) used in the shaft assembly 210, and/or the like. To accommodate the thermal expansion along the shaft axis, the spring connection 215 may be used, for example, to allow the shaft assembly 210 to expand and contract without damaging other components (e.g., the thrust bearing 310 (FIG. 3)). FIG. 13 shows various features for an example spring connection 215 usable in accordance with aspects of the present disclosure. The spring connection 215 may include one or more springs, such as three springs as shown in FIG. 13, which may couple the shaft assembly 210 to the thrust bearing 310 shown in FIG. 3. The spring(s) may be formed using any suitable material(s), such as metallic, or a brittle material, such as a carbon fiber composite. When the spring(s) are formed using a brittle material, the spring(s) may be used as elevated temperatures.

Figure 14:
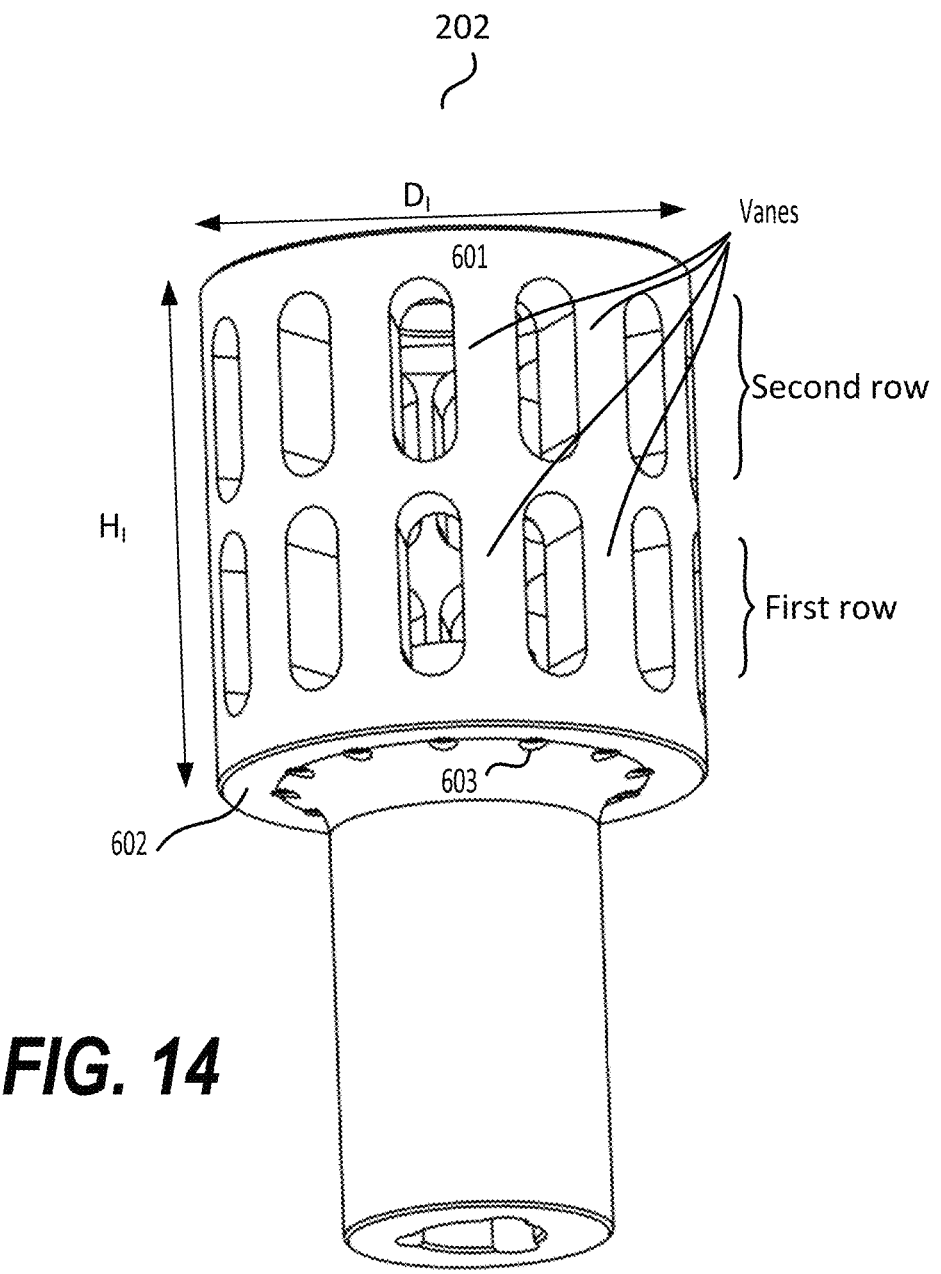
FIG. 14 shows an example of an impeller in the pump according to an aspect of the disclosure.

Referring to FIGS. 2, 3, and 14, the impeller 202 (FIG. 2) may include vanes that are cut into a three-dimensional (3D) surface, such as a cylindrical surface 601, as shown in FIG. 14. In an example, the vanes of the impeller 202 are cut into a cylinder. Thus, the vanes of the impeller 202 are 3D vanes in that the vanes are positioned on the cylindrical surface 601 instead of on a planar surface. The 3D vanes used in the impeller 202 differ from flat vanes (e.g., disc-shaped vanes) used in some pumps generally in the art. Two rows of vanes including a first row and a second row are shown in FIG. 14. The impeller 202 may include any number of rows of vanes, such as one row or multiple rows. Any suitable pattern may be used to form the vanes, for example, on the cylindrical surface 601. In an example implementation, a ratio of the height $H_I$ of the cylindrical surface 601 to the diameter $D_I$ of the cylindrical surface 601 may be above a threshold. The impeller 202 including the 3D vanes having a relatively large ratio of $H_I/D_I$ may be configured to transport the liquid material with a large flow rate (e.g., 1000 gallons per minute) at a low rotational speed. In an example, the ratio of $H_I/D_I$ may range from 0.1 to 100. the In an example, the rotational speed may be 10 rotations per minute (rpm). In some examples, the rotational speed may range from 10 rpm to 10000 rpm. Referring to FIG. 14, the impeller 202 is a squirrel cage style impeller, and the vanes are cut into a cylinder.

The flow rate may scale with the length of the impeller 202. In an example implementation, a long length may be selected for the impeller 202 to achieve a large flow rate. In an example implementation, the radius and the length of the impeller 202 may be selected to achieve a flow rate of about 3000 gallons per minute (gpm) from a single pump (e.g., the pump 230). In an example implementation, liquid material in the entire system 100 may be pumped using very few pumps. In an example implementation, in addition to the pump 230, additional pump(s) may be positioned in the system 100 as backup pumps that may remain idle when not needed. Part of the purpose of using a cage style impeller (such as the impeller 202 shown in FIG. 14) with a large $H_I/D_I$ ratio is to maximize the flow rate achieved from a single pump. Since the differential pressures used in the energy storage application may not be particularly high (e.g., <100 psi), the pump 230 can be optimized towards maximizing its flow rate. It is useful because, for example, the achieved pump flow rate may directly translate to the amount of charging or discharging power a thermal battery can achieve. If, for example, the nominal flow rate is approximately 1000 gpm, it might enable approximately 25 MW of electrical power input or output. Furthermore, an increase in system cost by simply increasing the size/length of the impeller and the corresponding motor is negligible. Therefore, by maximizing the pump flow rate, the total number of pumps for the system to operate can be minimized, which has a number of benefits. First, having less pumps translates to a lower probability of failure during operation. Secondly, the amount of heat loss/wasted, which is associated with each pump shaft and for example, may require a penetration through the insulation, becomes a smaller fraction of the total system power when the number of pumps is minimized. Further, minimizing the number of pumps used also maximizes the number of redundant pumps that can be installed for backup and reliability.

The impeller 202 may include opening 603, for example, at a bottom surface 602 of the impeller 202, as shown in FIG. 14. The bottom surface 602 may be perpendicular to the axial direction of extension of the cylindrical surface 601. The openings 603 may be formed to relieve pressure, and the openings 603 may interchangeably also be referred to herein as pressure relief holes. These holes help to reduce the thrust load born by the thrust bearing, while having minimal impact on the pump performance.

The requirements for the pump 230 may include mechanical stability of the pump 230. The openings 603 (e.g., the holes) may reduce the thrust load, for example, by draining the liquid material via the openings 603. Thus, the impeller 202 may be configured to achieve a large flow rate and increase the mechanical stability of the pump 230 to handle the structural loads (e.g., the thrust load).

In an example implementation, referring to FIG. 2, the first shaft 211, which is surrounded by the motor 201, may be a hollow shaft, for example, to accommodate thermal expansion when the pump 230 temperature goes from room temperature to an operating temperature (e.g., 2400° C.). In an example implementation, the first shaft 211 may be made of any suitably robust material, such as stainless steel. The first shaft 211 may be modified to be hollow along its axial center in order to allow cooling gas (e.g., Ar) to pass through the portion of the shaft that is hollow. Thus, the first shaft 211 and the motor 201, which are located in the cold zone, may be cooled by the cooling gas, thereby allowing easy coupling of the motor 201, for example, formed using metal, to the rest of the pump 230 that may be located in the hot zone and may be formed using brittle materials.

Referring to FIGS. 2-3, materials used to form various components (e.g., the second shaft 212, the bearings 203-204, the impeller 202, and the like) that are positioned below plate 250 may be comprised of brittle materials, such as ceramics, graphite, and/or the like. Materials used to form various components (e.g., the first shaft 211, the motor 201, and the like) that are positioned above the plate 250 may include metal, such as stainless steel. The plate 250 may be formed using stainless steel, for example.

Figure 15:
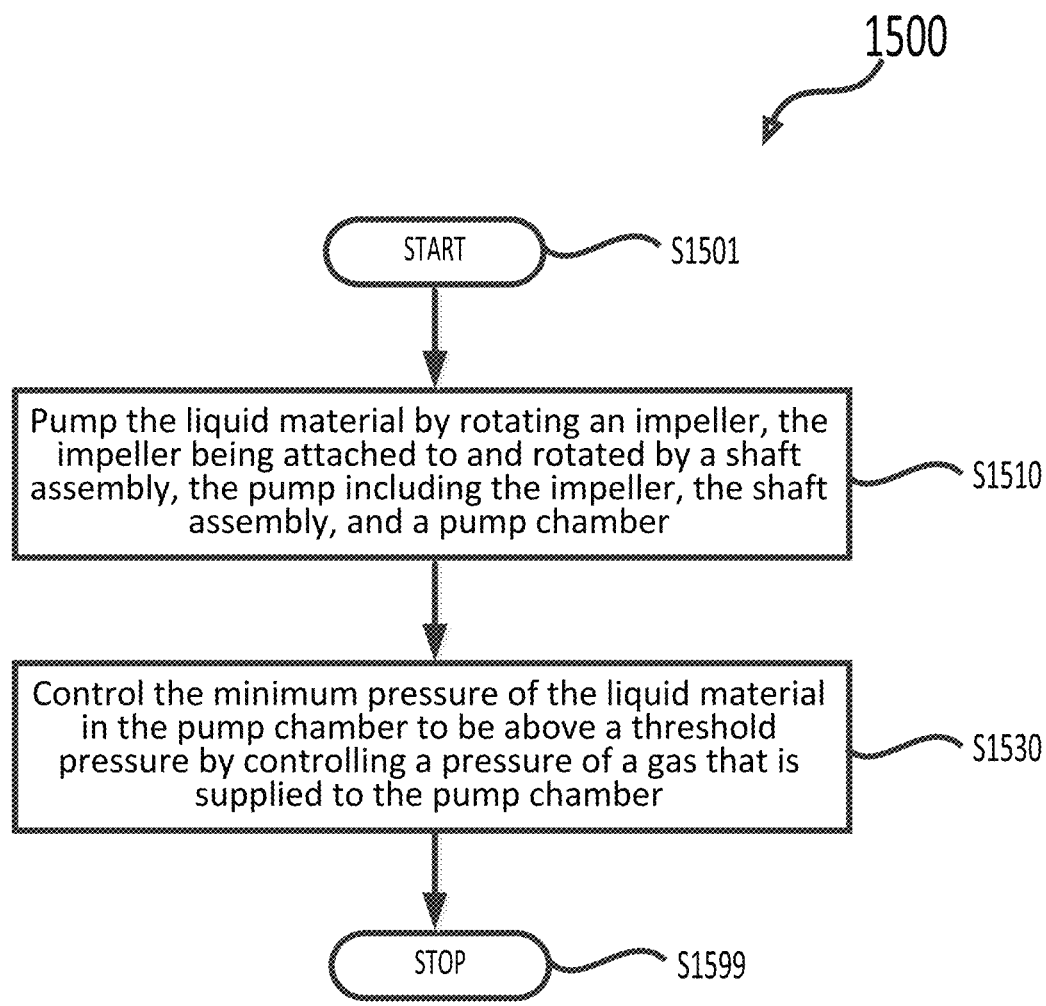
FIG. 15 shows a flow chart outlining an example process according to an aspects of the disclosure.

FIG. 15 shows a flow chart outlining an example process 1500 to pump a liquid material according to an aspect of the disclosure. The process 1500 may be performed using a pump such as the pump 130 (FIG. 1), the pump 230 (FIGS. 2-3), or the like, to transport a liquid material, such as a high temperature liquid material (e.g., liquid Sn) at a large flow rate. The process 1500 may be performed in a thermofluidic handling system, such as a thermal battery system (e.g., the system 100 of FIG. 1). The pump may include various features, such as an impeller, a shaft assembly, and a pump chamber as described and shown throughout the present disclosure and figures. The process 1500 may start from S1501 and proceed to S1599.

At S1510, the liquid material (e.g., liquid Sn) may be pumped, such as by rotating the impeller in the pump. The impeller may be attached to and rotated by the shaft assembly in the pump, for example. In an example implementation, the pump may operate at a flow rate of at least 0.1 gallons per minute (e.g., from 0.1 to 100,000 gpm) and at a temperature between 1000° C. and 3000° C.

In an example implementation, the shaft assembly may include a first shaft attached to a motor in the pump, a second shaft attached to the impeller, and a coupling component that are physically attached to the first shaft and the second shaft. The first shaft and the second shaft may be separated by a gap along a shaft axis of the shaft assembly. The coupling component may surround the first shaft and the second shaft. The motor may cause the first shaft to rotate, the first shaft in turn causing the rotation of the shaft assembly, including the second shaft. The rotation of the second shaft may cause the rotation of the impeller.

In an example implementation, vanes of the impeller may be cut into a cylindrical surface, and a ratio of a height of the cylindrical surface over a diameter of the cylindrical surface may be above a threshold, for example, to achieve a large flow rate, such as along the lines of or consistent with as described in relation to FIG. 14. In an example implementation, the impeller may comprise openings (e.g., holes) at a bottom surface that is perpendicular to axial direction of extension of the cylindrical surface, along the lines as described in relation to FIG. 14.

At S1530, the minimum pressure of the liquid material in the pump chamber may be controlled so as to be above a threshold pressure by controlling a pressure of a gas (e.g., an inert gas such as Ar) that is supplied to the pump chamber. In an example implementation, the minimum pressure of the liquid material may be larger than a vapor pressure of the liquid material in order to avoid cavitation.

Then, the process proceeds to S1599 and terminates.

The process 1500 may be readily adapted. Step(s) in the process 1500 may be modified and/or omitted. Additional step(s) may be added. Any suitable order of implementation may be used.

In an example implementation, a gas-liquid interface may be formed between the liquid material and the gas (e.g., an inert gas such as Ar) by supplying the gas to the pump chamber. A position (e.g., a height within the pump chamber) of the gas-liquid interface in the pump chamber may depend at least on the pressure of the gas. The liquid material may be positioned below the gas-liquid interface, such as shown and described in relation to FIG. 3.

In an example implementation, the method may also include filling, at least via grooves in a bearing that surrounds a region of the shaft assembly, the liquid material between the bearing and the region to lubricate the bearing, such as shown and described in relation to FIGS. 4-8. The bearing (e.g., described in FIGS. 4-8) may be separated from the shaft assembly by the liquid material.

In an example implementation, the method may include radiatively cooling a region of the shaft assembly by surrounding the region of the shaft assembly with a cooling component having a cylindrical shape, such as shown and described in relation to FIGS. 11-12. An inner surface of the cooling component may be black and absorb thermal radiation from the shaft assembly. The cooling component may be cooled externally, for example, by circulating coolant, such as water.

In an example implementation, the pump chamber may be coupled to the shaft assembly using one or more springs, such as shown and described in relation to FIG. 13.

In an example implementation, the pump may further comprise one or more bearings that surround the shaft assembly. The one or more bearings may be separated from the shaft assembly. The shaft assembly, the impeller, and the one or more bearings may be formed using a brittle material, such as ceramic material(s) or graphite.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

While this disclosure has described several example embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A pump, comprising:
    a shaft assembly;
    an impeller attached to the shaft assembly;
    a motor configured to rotate the shaft assembly attached to the motor, wherein:
        the shaft assembly configured to cause the impeller to rotate, and the impeller configured to transport a liquid material;
a pump chamber comprising an inlet for gas to enter the pump chamber; and
a cooling component configured to radiatively cool the shaft assembly by absorbing thermal radiation from the shaft assembly, wherein:
the cooling component has a cylindrical shape that surrounds a region of the shaft assembly,
the cylindrical shape of the cooling component has an inner surface that is black,
the cooling component is configured to be cooled externally, and
a pressure of a gas in the pump chamber is controlled.

2. The pump of claim 1, further comprising a bearing surrounding a region of the shaft assembly, wherein:
the bearing has a cylindrical shape and comprises grooves on an inner surface of the bearing,
the grooves of the bearing are configured to transport the liquid material, and
the bearing is configured to be separated from the shaft assembly by the liquid material.

3. The pump of claim 1, wherein:
the shaft assembly comprises a first shaft attached to the motor, a second shaft attached to the impeller, and a coupling component that is physically attached to the first shaft and the second shaft,
the first shaft and the second shaft are separated by a gap along a shaft axis of the shaft assembly, and
the coupling component surrounds the first shaft and the second shaft.

4. The pump of claim 1, wherein:
the impeller comprises a cylindrical surface and vanes that are positioned on the cylindrical surface, and
the impeller comprises a bottom surface, perpendicular to the cylindrical surface, and openings through the bottom surface.

5. The pump of claim 1, wherein the pump chamber is coupled to the shaft assembly using one or more springs.

6. The pump of claim 1, wherein:
the pump further comprises a bearing that surrounds the shaft assembly,
the bearing is separated from the shaft assembly such that the liquid material is configured to flow into a gap between the bearing and the shaft assembly thereby reducing surface-to-surface contact between the bearing and the shaft assembly, and
the shaft assembly, the impeller, and the bearing are formed from a brittle material.

7. The pump of claim 6, wherein:
one of the bearing or the shaft assembly comprises a coating formed on an outer surface of the one of the bearing or the shaft assembly, and
the coating comprises carbon.

8. The pump of claim 6, wherein the brittle material comprises graphite.

9. The pump of claim 1, wherein:
the pump is configured to operate at a flow rate that is at least 1000 gallons per minute, and
the liquid material comprises liquid tin (Sn).

10. The pump of claim 1, further comprising a thrust bearing, positioned proximate to the motor and coupled to the shaft assembly.

11. The pump of claim 10, wherein the thrust bearing comprises graphite.

12. The pump of claim 10, wherein the thrust bearing has a disc shape.

13. The pump of claim 10, wherein:
the pump is defined by a first temperature zone and a second temperature zone such that the second temperature zone has a higher temperature than the first temperature zone during operation of the pump,
the thrust bearing and the motor are positioned in the first temperature zone,
the impeller is positioned in the second temperature zone.

14. The pump of claim 13, further comprising a bearing that surrounds the shaft assembly, formed from a brittle material, and positioned in the second temperature zone.

15. The pump of claim 13,
the shaft assembly comprises a first shaft, a second shaft, and a coupling component interconnecting the first shaft and the second shaft,
the first shaft is attached to each of the thrust bearing and the motor and is positioned in the first temperature zone,
the second shaft is attached to the impeller and is positioned in the second temperature zone, and
the coupling component extends between the first temperature zone and the second temperature zone.

16. The pump of claim 15, wherein:
the first shaft is formed from stainless steel, and
the second shaft is formed from graphite.

17. The pump of claim 15, wherein:
the first temperature zone is a first temperature during the operation of the pump,
the second temperature zone is a second temperature during the operation of the pump, and
the second temperature is larger than or equal to 10 times that of the first temperature.

18. A pump, comprising:
a shaft assembly;
an impeller attached to the shaft assembly;
a motor configured to rotate the shaft assembly attached to the motor, wherein:
the shaft assembly is configured to cause the impeller to rotate, and
the impeller configured to transport a liquid material;
a pump chamber comprising an inlet for a gas to enter the pump chamber; and
a pressure of the gas in the pump chamber is controlled, and
the pump chamber is coupled to the shaft assembly using one or more springs.

19. The pump of claim 18, further comprising a thrust bearing, positioned proximate to the motor and coupled to the shaft assembly.

20. The pump of claim 19, wherein the thrust bearing comprises graphite and has a disc shape.

* * * * *